(12) United States Patent
Lin

(10) Patent No.: US 10,120,821 B2
(45) Date of Patent: Nov. 6, 2018

(54) COUPLING SYSTEM FOR ELECTRONIC DEVICE

(71) Applicants: HONGFUJIN PRECISION ELECTRONICS(CHONGQING)CO. LTD, Chongqing (CN); HON HAI PRECISION INDUSTRY CO., LTD., New Taipei (TW)

(72) Inventor: Ching-Chung Lin, New Taipei (TW)

(73) Assignees: HONGFUJIN PRECISION ELECTRONICS (CHONGQING)CO. LTD, Chongqing (CN); HON HAI PRECISION INDUSTRY CO., LTD., New Taipei (TW)

( * ) Notice: Subject to any disclaimer, the term of this patent is extended or adjusted under 35 U.S.C. 154(b) by 101 days.

(21) Appl. No.: 15/249,484

(22) Filed: Aug. 29, 2016

(65) Prior Publication Data

US 2017/0220501 A1  Aug. 3, 2017

(30) Foreign Application Priority Data

Jan. 30, 2016 (CN) .......................... 2016 1 0063122

(51) Int. Cl.
*G06F 13/364* (2006.01)
*G06F 13/42* (2006.01)
*G06F 13/40* (2006.01)

(52) U.S. Cl.
CPC ........ *G06F 13/364* (2013.01); *G06F 13/4081* (2013.01); *G06F 13/4247* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 2003/0074505 A1 | 4/2003 | Andreas et al. | |
| 2009/0144471 A1 | 6/2009 | Lin | |
| 2010/0095035 A1* | 4/2010 | Chen | H05B 37/0254 710/110 |

FOREIGN PATENT DOCUMENTS

| | | |
|---|---|---|
| DE | 19756564 | 6/1998 |
| TW | 201426528 | 7/2014 |

* cited by examiner

Primary Examiner — Idriss N Alrobaye
Assistant Examiner — Dayton Lewis-Taylor
(74) Attorney, Agent, or Firm — ScienBiziP, P.C.

(57) ABSTRACT

An electronic device coupling system includes a plurality of electronic devices and an external power supply. The plurality of electronic devices includes a master device and a plurality of slave devices coupleable to the master device one by one. Each electronic device has a sequence number according to an insertion sequence, the sequence number is corresponds to all the information of local electronic device, the sequence numbers of the plurality of electronic devices are sorted according to the insertion sequence, the sequence number of the master device is a first number of the sequence, and the master device is coupleable to at least one slave device by the sequence number and all the information corresponding to the sequence number. The at least one slave device is a customized group of the master device.

20 Claims, 14 Drawing Sheets

| | | |
|---|---|---|
| Rated power of the master device | ☐☐☐☐☐☐☐☐ | 90W |
| Total power of all inserted slave device | 80W | |
| | 25W 50W 5W | |
| Rated power of slave device 1 | 25W | |
| Rated power of slave device 2 | 50W | |
| Rated power of slave device 3 | 5W | |
| Residual power | 10W | |

COUPLING SYSTEM FOR ELECTRONIC DEVICE

FIELD

The subject matter herein generally relates to data transmission technology.

BACKGROUND

Electronic devices, such as electronic white boards, are coupled to slave devices, such as mobile phones, universal serial buses (USBs), and so on. The slave devices can be connected to the main electronic devices in parallel.

BRIEF DESCRIPTION OF THE DRAWINGS

Implementations of the present technology will now be described, by way of example only, with reference to the attached figures.

FIG. 7 shows a window of a display module showing a power supply state of the electronic device coupling system of FIG. 1.

DETAILED DESCRIPTION

Figure 1:
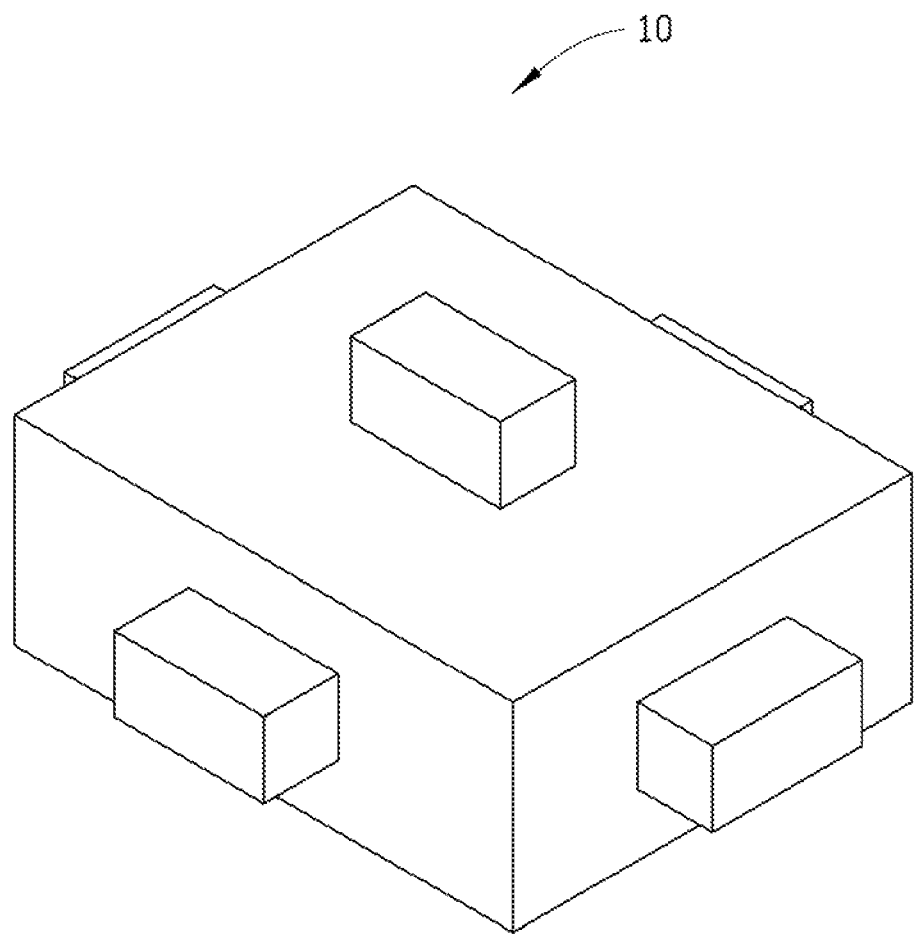
FIG. 1 is a sketch isometric view of one embodiment of an electronic device of an electronic device coupling system.
Figure 2:
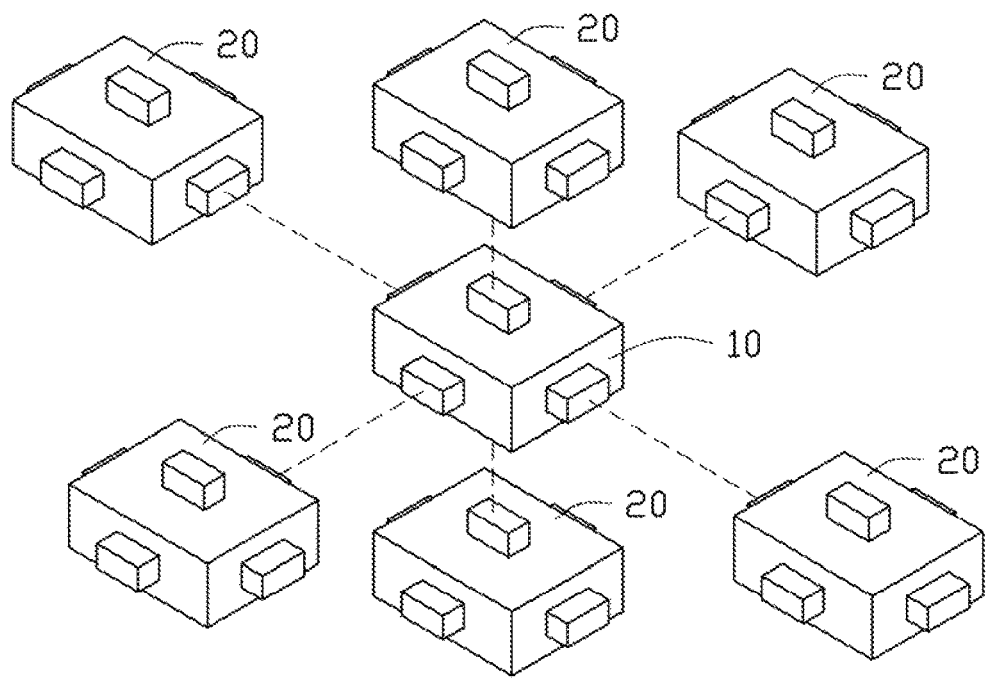
FIG. 2 is a sketch isometric view of a master device and a plurality of slave devices of the electronic device coupling system of FIG. 1.
Figure 3:
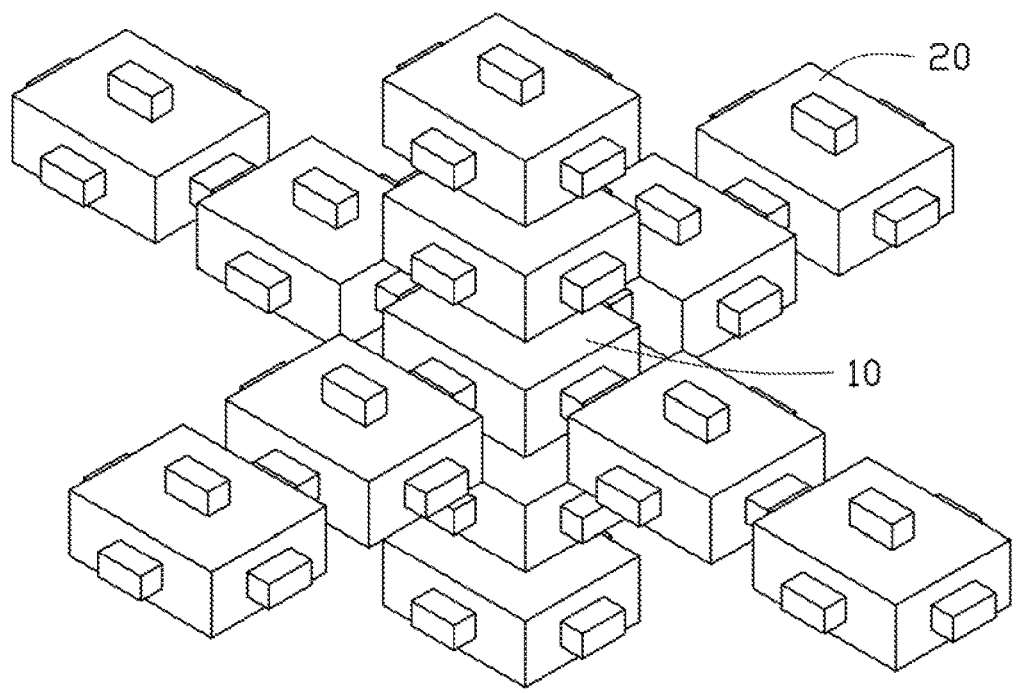
FIG. 3 is a sketch isometric view of the master device coupled to a plurality of slave devices of the electronic device coupling system of FIG. 1.
Figure 4:
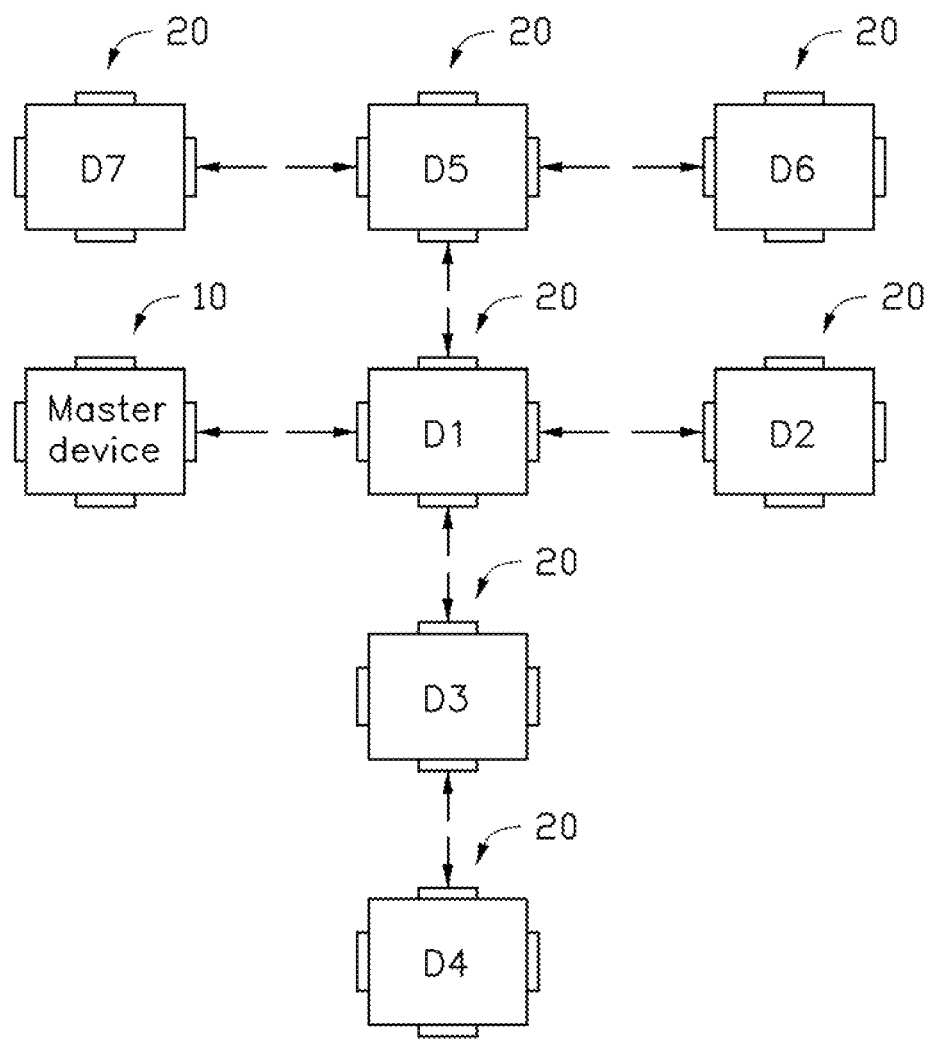
FIG. 4 is a block sketch view of the master device coupled to a plurality of slave devices of the electronic device coupling system of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIGS. 1-4 illustrate an electronic device coupling system in accordance with an embodiment. The electronic device coupling system can include a plurality of electronic devices, which can include a master devices 10 and a plurality of slave devices 20 coupleable to the master device 10 one by one in at least a train. In at least one embodiment, the at least a train can include two trains extending in two directions, one of the slave devices 20 is coupled to the master device 10 directly, and the other slave devices 20 are coupled to the master devices 10 one by one in X axis direction, Y axis direction, or Z axis direction. In other embedment, the plurality of electronic devices can include more than one master device, each electronic device can be the master device or the slave device according to usage. In at least one embodiment, each electronic device can be a mobile phone, a remoter, a tablet, a notebook, a washing machine, a refrigerator, an electric cooker, an induction cooker, a roaster, an air condition, a mouse, a keyboard, a camera, a microphone, a power supply, a voice box, a set box, a tuner box, or other WIFI device, or Bluetooth device, or RF device.

The slave devices 20 can cascade together in a plurality of directions, which has at least six directions (X, Y, Z), to build an array platform, to which the slaves devices 20 can coupled unlimitedly. Each electronic device has a plurality of coupling bus-bars each corresponding to one of the plurality of directions. The plurality of coupling bus-bars are a plurality of paired male and female coupling bus-bars. Two of the electronic devices are coupled together by corresponded two coupling bus-bars. Each coupling bus-bar can include a plurality of different types of coupling ports, such as power port, hot plug port, HDMI port, DP port, USB port, control port, MHL port, e-SATA port, LVDS port, V by one port, mipi port, and so on. Each port is coupled to a multiway switches, which is configured to couple to other ports having same type of local device or other electronic devices. In order to expediently describe, each electronic device only has four coupling bars in four different directions are disclosed.

Figure 5:
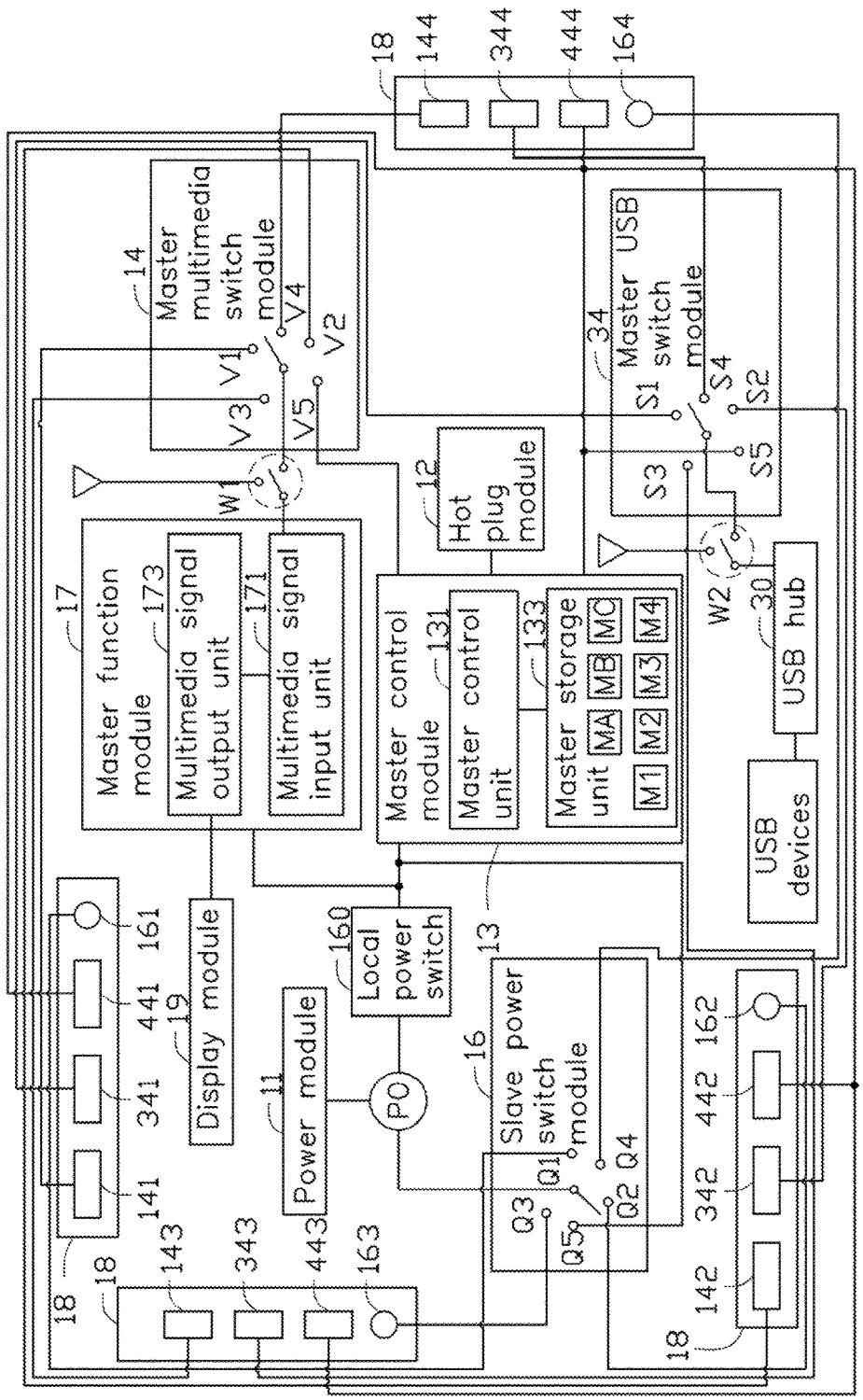
FIG. 5 is a block diagram of the master device of the electronic device coupling system of FIG. 1.
Figure 6:
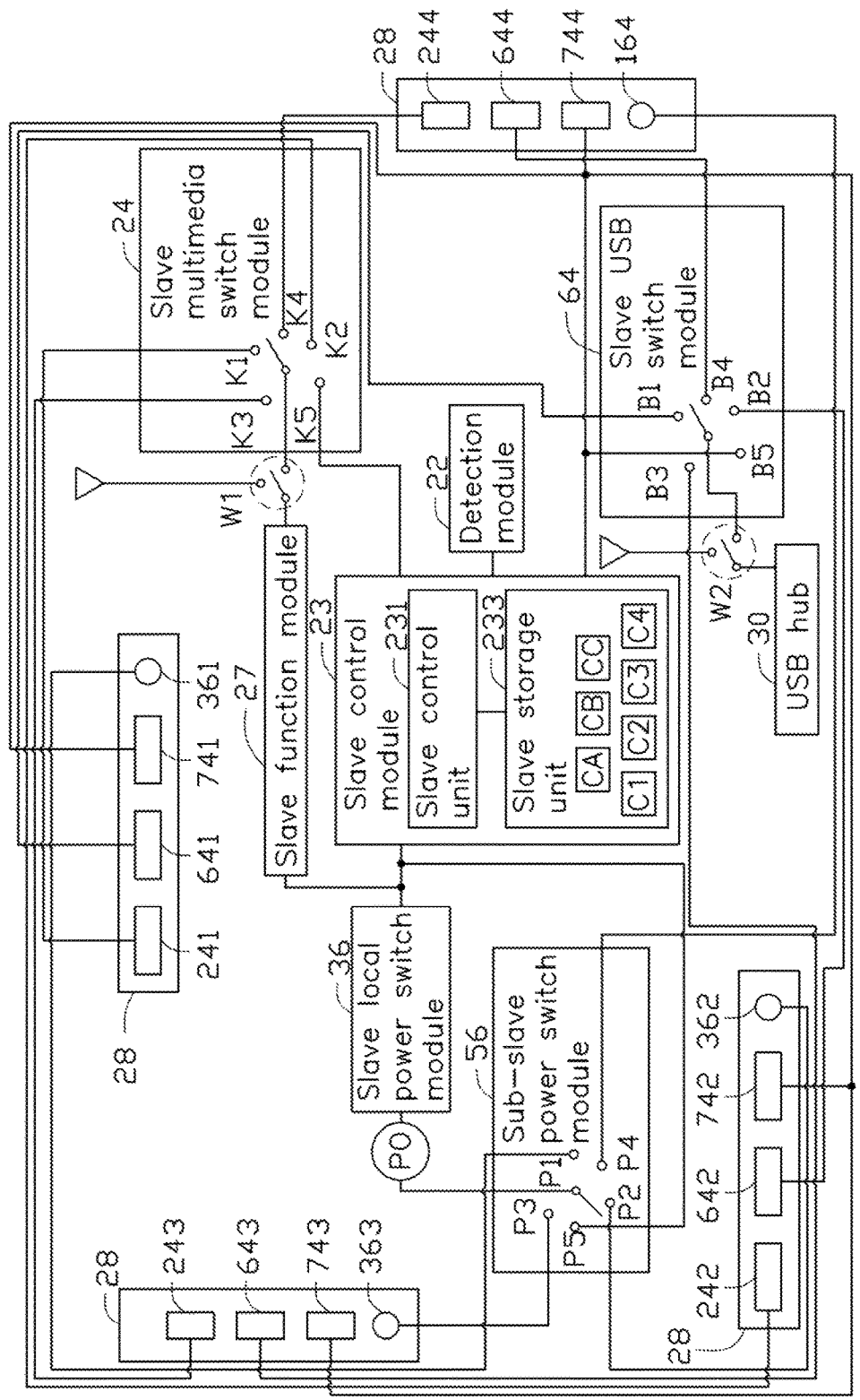
FIG. 6 is a block diagram of a slave device of the electronic device coupling system of FIG. 1.

FIGS. 5 and 6 illustrate the master device 10 can include a power module 11, a hot plug module 12, a master control module 13, a master multimedia switch module 14, a slave power switch module 16, a local power switch 160, and a master function module 17. The master control module 13 can be a micro control unit (MCU) of the master device 10, the maser function module 17 can be display module, audio module, etc. controlled by the MCU. Each slave device 20 has a same structure with the master device 10 or can be a socket structure, which is the master device 10 without the master function muddle and the power module.

The power module 11 is configured to supply power to the slave devices 20 coupled to the master device 10.

The hot plug module 12 is configured to determine whether a slave device 20 is coupled to the master device 10, if yes, the hot plug module 12 outputs a high level voltage signal to switch on a corresponded path of the slave power switch module 16; if no, the hot plug module 12 outputs a low level voltage. In at least one embodiment, the hot plug module 12 includes a pull-down resistor coupled to a male coupling bar and a pull-up resistor coupled to a female coupling bar.

The master function module 17 can include a multimedia signal input unit 171 and a multimedia signal output unit 173. The multimedia signal includes audio signal and video signal. The multimedia signal input unit 171 is configured to receive multimedia signal sent from the master control module 13 and the slave device 10. The multimedia signal sent from the master control module 13 can be local or received wirelessly/wired from other device. A multimedia signal switch W1 is configured to switch along local, wirelessly, and wired to choose a receiving/sending way of the multimedia signal. The multimedia signal output unit 173 is configured to output wirelessly/wired the multimedia signal received from the multimedia signal input unit 171 to a display module 19.

The master multimedia switch module 14 can include a plurality of multimedia switch paths. A first end of each multimedia switch path is coupled to the multimedia signal input unit 171. In this embodiment, a second end of a first multimedia switch path V1 is coupled to a master top multimedia port 141; a second end of a second multimedia switch path V2 is coupled to a master bottom multimedia port 142; a second end of a third multimedia switch path V3 is coupled to a master left multimedia port 143; a second end of a fourth multimedia switch path V4 is coupled to a master right multimedia port 144; and a second end of a fifth multimedia switch path V5 is coupled to the master control module 13. In other embodiment, the number of the plurality of multimedia switch paths can be decreased or increased accordingly.

Accordingly, each slave device 20 includes a slave multimedia switch module 24. The slave multimedia switch module 24 can include a plurality of multimedia switch paths. A first end of each multimedia switch path is coupled to a slave function module 27. In this embodiment, a second end of a first multimedia switch path K1 is coupled to a slave top multimedia port 241; a second end of a second multimedia switch path K2 is coupled to a slave bottom multimedia port 242; a second end of a third multimedia switch path K3 is coupled to a slave left multimedia port 243; a second end of a fourth multimedia switch path K4 is coupled to a slave right multimedia port 244; and a second end of a fifth multimedia switch path K5 is coupled to a slave control module 23. In other embodiment, the number of the plurality of multimedia switch paths can be decreased or increased accordingly.

The master device 10 can further include a USB hub 30 and a master USB switch module 34. The USB hub 30 is coupled to a plurality of USB devices, such as hard disk drive and input devices, such as keyboard, computer mouse, and write pad. The master USB switch module 34 can include a plurality of USB switch paths. A first end of each USB switch path is coupled to the USB hub 30. In this embodiment, a second end of a first USB switch path S1 is coupled to a master top USB port 341; a second end of a second USB switch path S2 is coupled to a master bottom USB port 342; a second end of a third USB switch path S3 is coupled to a master left USB port 343; a second end of a fourth USB switch path S4 is coupled to a master right USB port 344; and a second end of a fifth USB switch path S5 is coupled to the master control module 13. In other embodiment, the number of the plurality of USB switch paths can be decreased or increased accordingly.

Accordingly, each slave device 20 includes a slave USB switch module 64. The slave USB switch module 64 can include a plurality of USB switch paths. A first end of each USB switch path is coupled to a USB hub 30. In this embodiment, a second end of a first USB switch path B1 is coupled to a slave top USB port 641; a second end of a second USB switch path B2 is coupled to a slave bottom USB port 642; a second end of a third USB switch path B3 is coupled to a slave left USB port 643; a second end of a fourth USB switch path B4 is coupled to a slave right USB port 644; and a second end of a fifth USB switch path B5 is coupled to a slave control module 23. In other embodiment, the number of the plurality of USB switch paths can be decreased or increased accordingly.

The plurality of USB devices can be used by any slave device 20 coupled to the master device 10. For example, the hard disk drive can be taken as a storage of the slave device, and the input device can operation the slave device 20.

The master device 13 can include a master control unit 131 and a master storage unit 133. The master storage unit 133 can include a master information storage MA, a slave code storage MC, a soft code storage MB, a slave information storage M1, a master power storage M2, a slave power storage M3, and a slave total power storage M4.

The master control unit 131 is coupled to the slave control modules 23 of all the slave device 20 coupled to the master device 10 and configured to obtain all the information of each slave device 20 and store the information to corresponding storages. The master control unit 131 sets a group slave codes according to a coupling sequence of the coupled slave devices 20. The master device 10 has a master code of a first number of the coupling sequence. Each slave device 20 stores the master code and slave codes of other slave devices coupled together.

That is, when the master device 10 is coupled to the plurality of slave devices 20 one by one, this electronic devices are coupled to an electronic system, and each electronic device has an IP code according to the coupling sequence in the electronic system.

The master information storage MA is configured to store the master information of the master device 10. The master information include address code, such as ID code and IP code, device model, such as iphone 6s, I/O type, and master soft control code etc. The master soft control code can include brightness adjustment control code, channel adjustment control code, volume adjustment control code, power on/off etc.

The slave code storage MC is configured to store slave codes and coupling paths of each slave device 20. Referring to FIG. 1, the slave code D1 is the slave device firstly coupled to the master device, and the coupling path is V-V4, K-K4. The slave code D2 is the slave device secondly coupled to the master device, and the coupling path is V-V4-S, K-K4-B4. The slave code D3 is the slave device thirdly coupled to the master device, and the coupling path is V-V4-S2, K-K4-B2. The slave code D4 is the slave device fourthly coupled to the master device, and the coupling path is V-V4-S2-S2. The slave code D5 is the slave device fifthly coupled to the master device, and the coupling path is V-V4-S, K-K4-B1. The slave code D6 is the slave device sixthly coupled to the master device, and the coupling path is V-V4-S1-S, K-K4-B1-B4. The slave code D7 is the slave device seventhly coupled to the master device, and the coupling path is V-V4-S1-S3, K-K4-B1-B3.

The soft code storage MB is configured to store the soft code of each slave device 20. When the slave device 20 is a bulb, the soft code can be power on/off code and brightness code; when the slave device 20 is a radio, the soft code can be power on/off code, channel code, and volume code; and when the slave device 20 is a TV, the soft code can be power on/off code, channel code, volume code, brightness code, and grayscale code.

The slave information storage M1 is configured to store the slave information of each slave device 20. The slave information include address code, such as ID code and IP code, device model, such as iphone 6s, I/O type etc.

The master power storage M2 is configured to store rated power of the master device 10, such as 90 W.

The slave power storage M3 is configured to store rated power of each slave device 20, such as 25 W, 50 W, and 5 W.

The slave total power storage M4 is configured to store total power of all the coupled slave devices 20. In this embodiment, the total power is 80 W.

The local power switch 160 is coupled to the master function module 17 and the master control module 13 and configured to switch on/off a connection from the power module 11 to the master function module 17 and the master control module 13 by pressing a power on/off key of the mater device 10.

The slave power switch module 16 can include a plurality of power switch paths. A first end of each power switch path is coupled to the power module 11. In this embodiment, a second end of a first power switch path Q1 is coupled to a master top power port 161; a second end of a second power switch path Q2 is coupled to a master bottom power port 162; a second end of a third power switch path Q3 is coupled to a master left power port 163; a second end of a fourth power switch path Q4 is coupled to a master right power port 164; and a second end of a fifth power switch path Q5 is coupled between the local power switch 160 and the master control module 13. In other embodiment, the number of the plurality of power switch paths can be decreased or increased accordingly.

Accordingly, each slave device 20 includes a slave local power switch module 36 and a sub-slave power switch module 56. A first terminal of the slave local power switch module 36 is coupled to a slave function module 27 and a slave control module 23. The sub-slave power switch module 56 can include a plurality of slave power switch paths. A first end of each power switch path is coupled to a second terminal of the slave local power switch module 36. In this embodiment, a second end of a first slave power switch path R1 is coupled to a slave top power port 361; a second end of a second slave power switch path R2 is coupled to a slave bottom power port 362; a second end of a third slave power switch path R3 is coupled to a slave left power port 363; a second end of a fourth power switch path R4 is coupled to a slave right power port 364; and a second end of a fifth power switch path R5 is coupled to the first terminal of the slave local power switch module 36. In other embodiment, the number of the plurality of power switch paths can be decreased or increased accordingly.

The slave codes and coupling paths of each slave device 20 stored in the slave code storage MC further include master power ports coupling paths and slave power ports coupling paths. In this embodiment, the slave code D1 is the slave device firstly coupled to the master device, and the coupling path is V-V4, K-K4, Q-Q4. The slave code D2 is the slave device secondly coupled to the master device, and the coupling path is V-V4-S4, K-K4-B4, Q-Q4-R4. The slave code D3 is the slave device thirdly coupled to the master device, and the coupling path is V-V4-S2, K-K4-B2, Q-Q4-R2. The slave code D4 is the slave device fourthly coupled to the master device, and the coupling path is V-V4-S2-S2, K-K4-B2-B2, Q-Q4-R2-R2. The slave code D5 is the slave device fifthly coupled to the master device, and the coupling path is V-V4-S1, K-K4-B1, Q-Q4-R1. The slave code D6 is the slave device sixthly coupled to the master device, and the coupling path is V-V4-S1-S4, K-K4-B1-B4, Q-Q4-R1-R4. The slave code D7 is the slave device seventhly coupled to the master device, and the coupling path is V-V4-S1-S3, K-K4-B1-B3, Q-Q4-R1-R3.

The master device 10 can further include a plurality of master bus-bars 18. In this embodiment, the plurality of master bus-bars 18 include a top bus-bar, a bottom bus-bar, a left bus-bar, and a right bus-bar, each master bus-bar 18 includes a plurality of master multimedia ports, which include the master multimedia top port 141, the master multimedia bottom port 142, the master multimedia left port 143, and the master multimedia right port 144; a plurality of master USB ports, which include the master USB top port 341, the master USB bottom port 342, the master USB left port 343, and the master USB right port 344; a plurality of master control ports, which include the master control top port 441, the master control bottom port 442, the master control left port 443, and the master control right port 444, configured to couple the slave devices 20 and the master device 10; and a plurality of master power ports, which include the master power top port 161, the master power bottom port 162, the master power left port 163, and the master power right port 164. The types of ports in each master bus-bar 18 can include HDMI, DP, USB, type-C, DC power port, e-SATA, PCIE, MHL, LVDS, V by one, mipi, etc.

Correspondingly, each slave device 20 can further include a plurality of slave bus-bars 28. In this embodiment, the plurality of slave bus-bars 28 include a top bus-bar, a bottom bus-bar, a left bus-bar, and a right bus-bar, each slave bus-bar 28 includes a plurality of slave multimedia ports, which include the slave multimedia top port 241, the slave multimedia bottom port 242, the slave multimedia left port 243, and the slave multimedia right port 244; a plurality of slave USB ports, which include the slave USB top port 641, the slave USB bottom port 642, the slave USB left port 643, and the slave USB right port 644; a plurality of slave control ports, which include the slave control top port 741, the slave control bottom port 742, the slave control left port 743, and the slave control right port 744, configured to couple the slave devices 20 and the master device 10; and a plurality of slave power ports, which include the slave power top port 361, the slave power bottom port 362, the slave power left port 363, and the slave power right port 364. The types of ports in each slave bus-bar 28 can include HDMI, DP, USB, type-C, DC power port, e-SATA, PCIE, MHL, LVDS, V by one, mipi, etc.

Each electronic device can further comprises a power node PO. In the master device 10, the power node PO is coupled between the first end of each power switch path and the local power switch 160. In the slave device 20, the power node PO is coupled between the second terminal of the slave local power switch module 36 and the first end of each power switch path. The power node PO is configured to couple to an external power supply to receive power from the external power supply to supply the power for the last coupled slave device when a rated power of the master device 10 is lower than the total power of all the coupled slave devices. The rated power of the external power supply can be added into the rated power of the master device 10 and the master device 10 can further supply other slave device coupled to the last coupled slave device.

The slave control module 23 of each slave device 20 can be a micro control unit (MCU), and the slave function module 27 can include a display module, an audio muddle, etc. controlled by the MCU.

The slave control module 23 can include a slave control unit 231 and a slave storage unit 233. The slave storage unit 233 can include a slave information storage CA, a master code storage CC, a soft code storage CB, a master information storage C1, a local power storage C2, a residual power storage C3, and a sub-slave code storage C4.

The slave control unit 231 is coupled to the slave control modules 23 of all the slave device 20 coupled together and the maser control module 13 of the master device 10 and configured to obtain all the information of the master device 10 and store the information to corresponding storages. The slave control unit 231 sets a group master codes according to a coupling sequence of the coupled master devices 10 and the stores the master codes to the master code storage CC.

The slave information storage CA is configured to store the slave local information. The slave local information can include address code, such as ID code and IP code, device model, such as iphone 6s, I/O type, and slave soft control code etc. The slave soft control code can include brightness adjustment control code, channel adjustment control code, volume adjustment control code, power on/off etc.

When each slave device 10 is inserted to the master device 10 directly or indirectly, the master device 10 is matched to the inserted slave device 20, and the slave devices 20 inserted together are also matched to other slave devices 20.

The master code storage CC is configured to store master codes and coupling paths corresponding to each master device 10. When one of the slave device is coupled to a matched master device, a corresponding coupling path is switched on.

The soft code storage CB is configured to store the soft code of each master device 10.

The master information storage C1 is configured to store the slave information of each master device 10. The master information include address code, such as ID code and IP code, device model, such as iphone 6s, I/O type etc.

The local power storage C2 is configured to store rated power of the local slave device 20.

The residual power storage C3 is configured to store a residual power of the master device 10. The residual power of the master device 10 is equal to that the rated power of the master device 10 minus the total power of all the coupled slave devices 20.

The sub-slave code storage C4 is configured to store sub-slave codes coupled the local slave device and coupling paths corresponding each sub-slave device.

Each slave device 20 further includes a detection module 22 configured to compare the residual power of the master device 10 with the local rated power of the slave device 20. When the residual power of the master device 10 is lower than the local rated power, the detection module 22 sends a break signal to the slave control module 23 to cut off the slave local power switch and the sub-slave power switch. In this position, the external power supply can be operated to supply power to the slave device 20 via the power node PO. The rated power of the external power supply is added to the residual power of the master device 10, and a new residual power of the master device 10 and a new total rated power of the master device 10 are restored in corresponding storage unit. In at least one embodiment, the external power supply can be coupled to the power node of the last slave device to supply power for the last slave device and next inserted slave device. In other embodiment, the external power supply can be coupled to the power node of any slave device to supply power for the last slave device and next inserted slave device. When the external power supply is coupled to the power node of any slave device except the last slave device, the detection module 22 compares the residual power of the master device 10 with the last slave device 20 again.

FIG. 7 illustrates the display module 19 of the master device 10 showing the rated power of the master device 10, the total power of all the coupled slave devices, rated power of each coupled slave device, and an overload remind, which shows the residual power of the master device 10.

When one of the slave devices 20 is needed to couple to the master device 10, a coupling key is pressed, the slave multimedia switch module 24 is switched to the fifth multimedia switch path K5 to couple to the slave control module 23, slave USB switch module 64 is switched to the fifth USB switch path B5 to couple to the slave control module 23. The slave control module 23 sends a coupling command to the master device 10. The coupling key can be a touch button or a physical button. The mater device 10 identifies the coupling command, the corresponding slave code, and corresponding coupling paths, so that controls the switch modules to switch on corresponding ports according to the identified corresponding coupling paths and further controls the soft control code of the master device 10 to couple to the soft function code of the slave code 20. Thus, the slave device 10 is coupled to the master device 10. The master device 10 can receive multimedia information from the slave device 20 and display the multimedia information in the display module 19, the hard disk drive 500 can be a storage device of the slave device 20, and the input devices can simultaneously control the master device 10 and the slave device 20.

Figure 8:
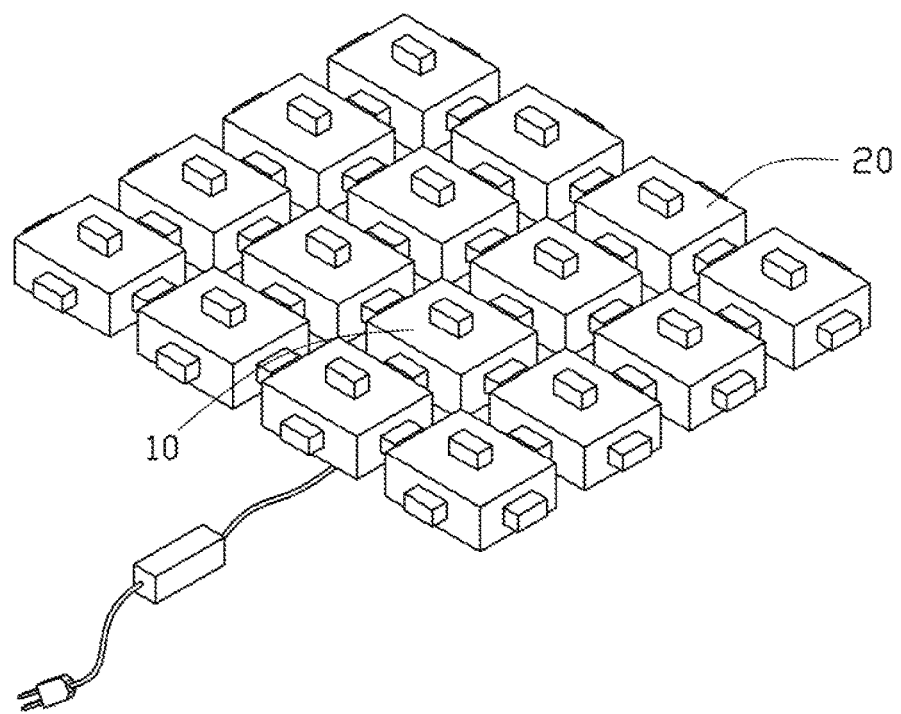
FIG. 8 shows a power supply coupled to the master device and a plurality of slave devices of the electronic device coupling system of FIG. 1.
Figure 9:
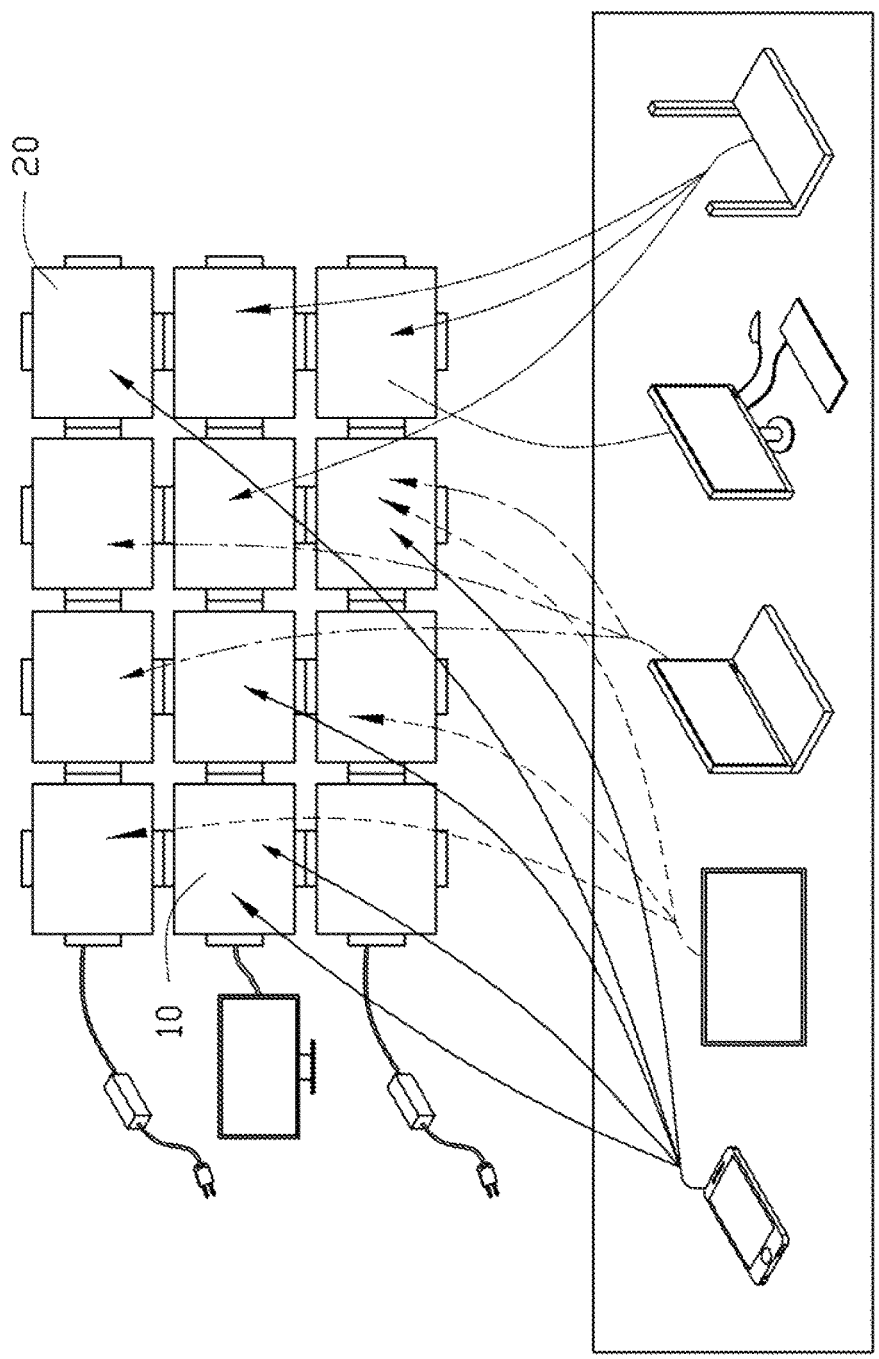
FIG. 9 is a sketch view of a plurality of master devices coupled to a plurality of slave devices of the electronic device coupling system of FIG. 1.
Figure 10:
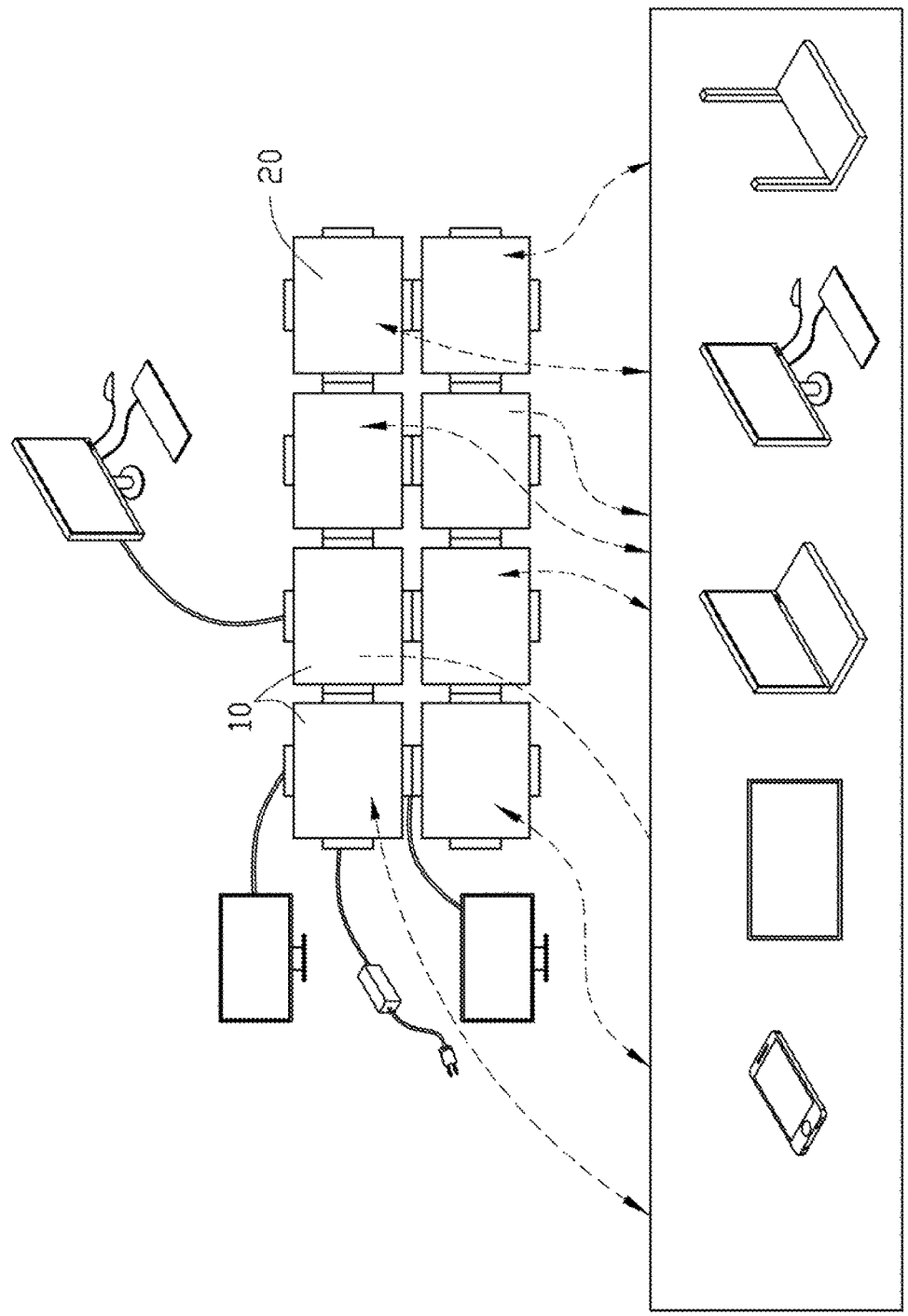
FIG. 10 is a sketch view of a plurality of master devices wirelessly or wired coupled to a plurality of slave devices of the electronic device coupling system of FIG. 1.

FIGS. 8-10 illustrate that each slave device 20 can be a new master device. The sub-slave code storage C4 stores sub-slave codes coupled to the local slave device and coupling paths corresponding each sub-slave device. Thus, when the slave device 20 is taken as a new master device, the slave device 20 can couple to other device according to the sub-slave codes and coupling paths.

When one of the slave devices 20 is coupled to the master device 10, other slave devices 20 can couple to each other. The electronic device coupling system can has a plurality of electronic group systems, each electronic group system has a group maser device and at least one group slave device. The group master device can be the master device 10 or any slave device 20. For example, the electronic device coupling system can include a first electronic group system G1 having a first group maser device 10 and a first group slave device D1; a second electronic group system G2 having a second group maser device D2 and two second group slave devices D2 and D3; and a third electronic group system G3 having a third group maser device D4 and three third group slave devices D5-D7. Each slave device can couple to the master device by pressing the coupling key, and the master device 10 can also click any slave device to couple to the corresponding slave device 20.

Figure 11:
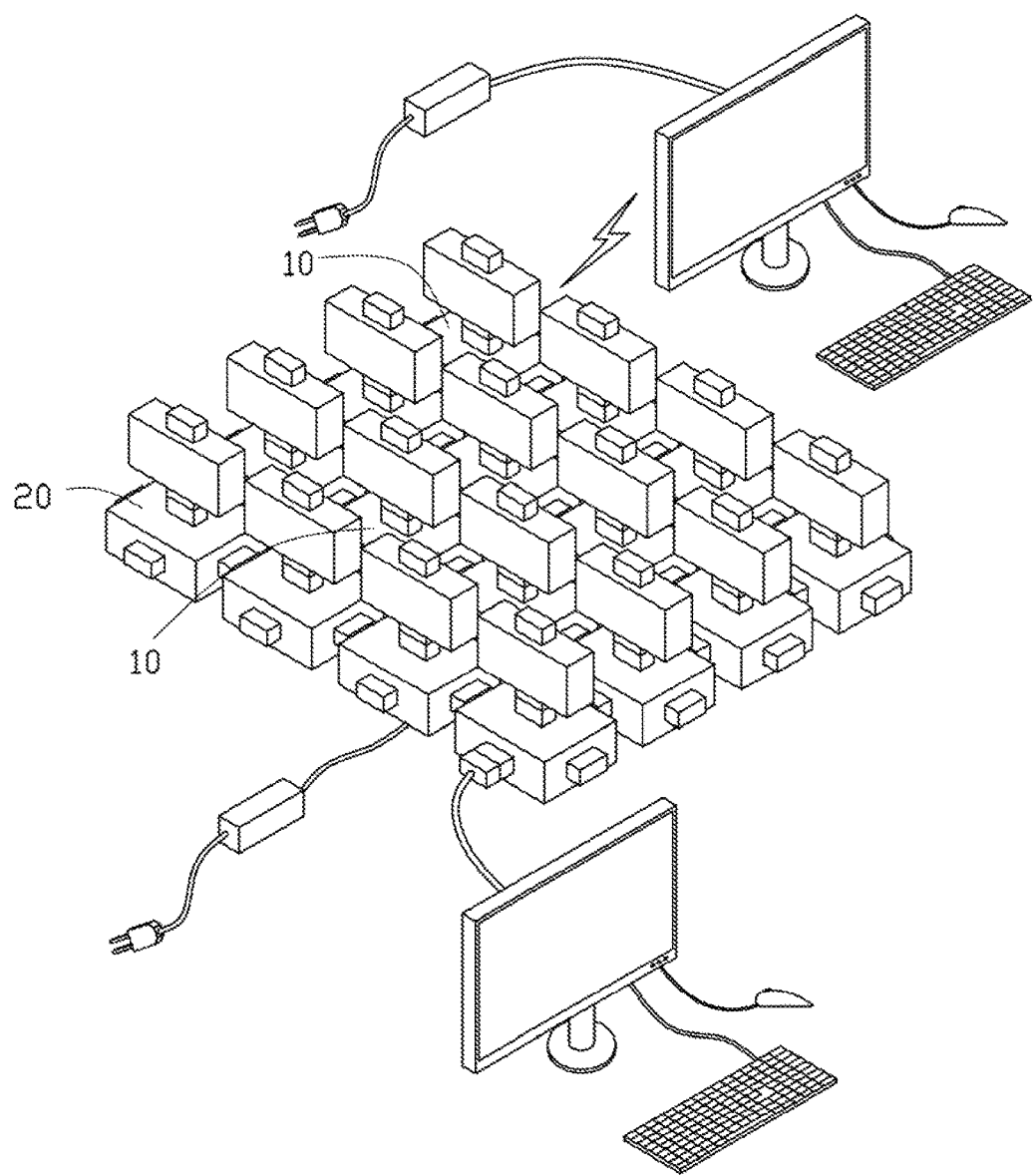
FIG. 11 is a sketch view of a public device coupled to a plurality of slave devices of the electronic device coupling system of FIG. 1.
Figure 12:
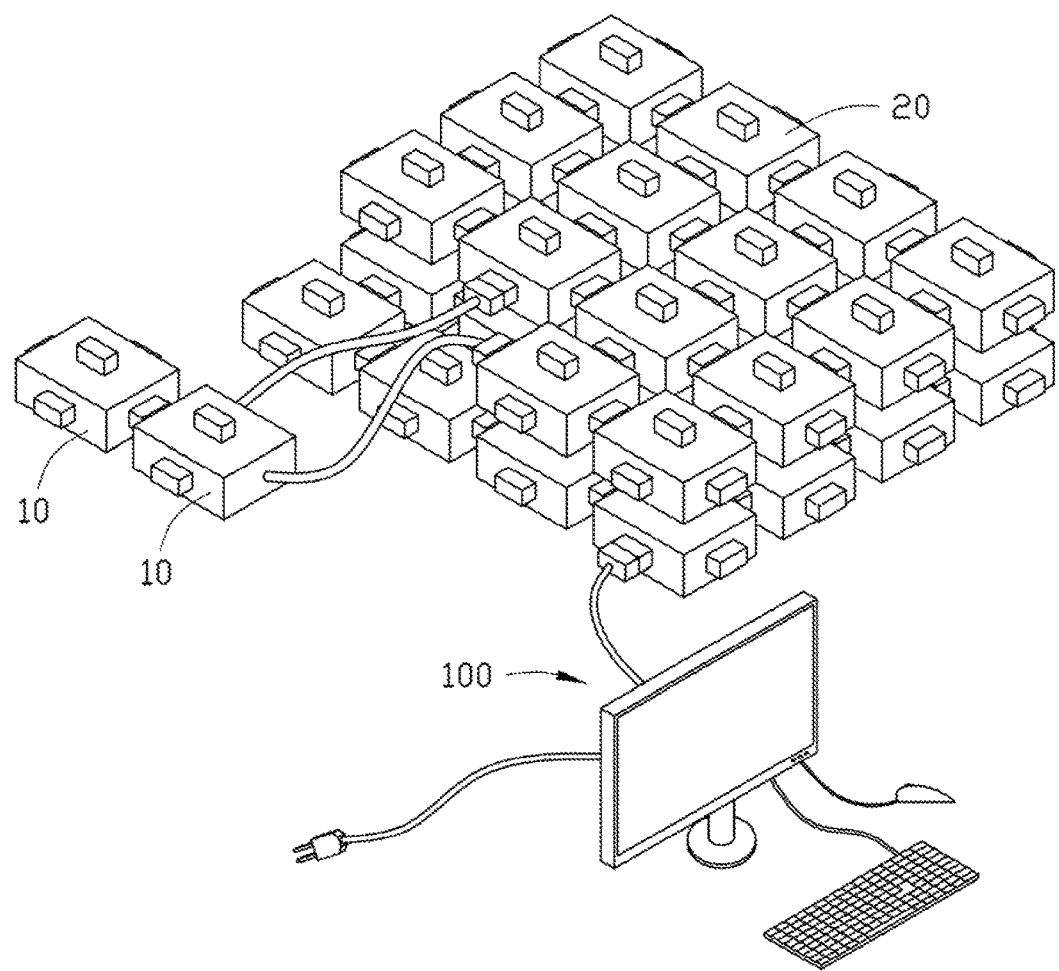
FIG. 12 is a sketch view of the public device wirelessly or wired coupled to a customization group of the electronic device coupling system of FIG. 1.

FIGS. 11-12 illustrate that an independent public device can include the display module 19, the mouse, the keyboard, and the hard disk drive and couple to one or more slave devices to consist a customization group. The one or more slave devices can include a computer host and a wifi module; a TV host; or a computer host, a Bluetooth module, and a wifi module. When the one or more slave devices are chosen by the public device, the corresponding switch paths are switched on to integrally couple to the public device.

Figure 13:
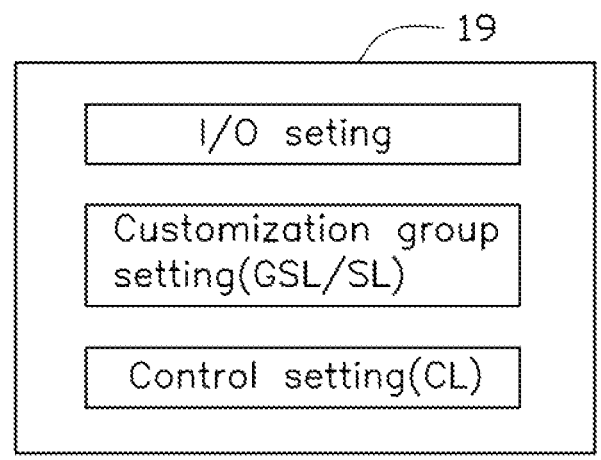
FIG. 13 shows a setting window, which showing the electronic device entering a customization group setting.
Figure 14:
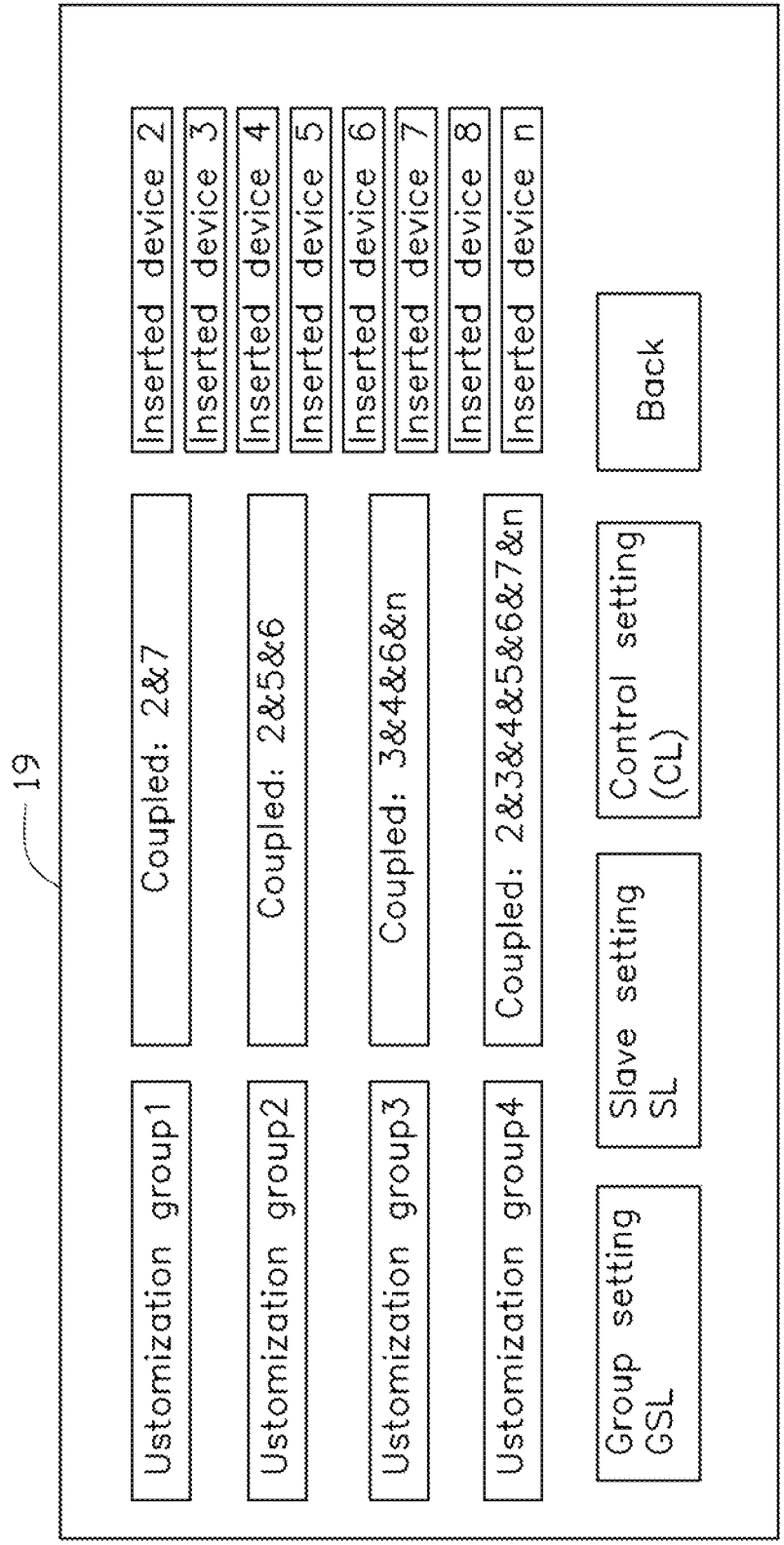
FIG. 14 shows a display window after the customization group setting is finished.

FIGS. 13-14 illustrate that the display module 19 has a switch interface, which shows an I/O format button, a GSL/SL button, and a CL button. The I/O format button can be touched to access into a customization group setting interface (shown as in FIG. 14). In this position, the master device reads and stores slave devices information into local corresponding storages, and each slave device reads and stores master device information and other slave devices information into local corresponding storages.

The GSL/SL button is configured to access into a customization group coupling interface and create a customization group code. The CL button is configured to couple the last slave device inserted to the master device.

When the GSL button is clicked, the display module 19 displays a window showing a customization group code 1. When the SL button is clicked, the display module 19 displays all the matched slave device codes, each matched slave device codes can be clicked to add into the customization group, when the SL button is further clicked, the matched slave devices are added into the customization group. When the GSL button is further clicked, all the devices in the customization group are coupled to the public device.

When the customization group is needed to change, the GSL button is clicked, the display module 19 displays the window showing the customization group code 1. The SL button is clicked, the display module 19 displays all the matched slave device codes, each matched slave device codes can be clicked to add into or deleted from the customization group, when the SL button is further clicked, the new slave devices are added into the customization group.

When a new customization group is needed to create, the GSL button is clicked, the display module 19 displays a new window showing a new customization group code 2.

The embodiments shown and described above are only examples. Many details are often found in the art such as the other features of an electronic device coupling system and method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device coupling system, the system comprising:
a plurality of electronic devices inserted together, the plurality of electronic devices comprises:
a master device; and
a plurality of slave devices inserted with the master device one by one in at least a chain;
wherein each electronic device has a sequence number according to an insertion sequence, the sequence number is corresponds to all the information of local electronic device, the sequence numbers of the plurality of electronic devices are sorted according to the insertion sequence, the sequence number of the master device is a first number of the sequence, and the master device is coupleable to at least one slave device by the sequence number and all the information corresponding to the sequence number; the at least one slave device is a customized group of the master device; and
wherein the master device corresponds to a plurality of customized groups, each customized group includes a different slave device assembly, and each customized group has a different group code stored in the master device.

2. The electronic device coupling system of claim 1, wherein the group code of each customized group is displayed on the master device.

3. The electronic device coupling system of claim 2, wherein the master device is coupleable to all the slave devices of any one customized group by select a corresponding group code of the customized group.

4. The electronic device coupling system of claim 1, wherein each slave device is capable of selecting other electronic devices to be a local customized group, and the slave device is a new master device of the local customized group.

5. The electronic device coupling system of claim 1, wherein each electronic device comprises a control module, a control bus, and a storage unit, the storage unit stores all the information, and when each slave device is inserted in the at least a chain, the slave device is mapped with the master device through the control bus and all the information.

6. The electronic device coupling system of claim 5, wherein when each slave device is mapped with the master device, a slave symbol corresponding to the mapped slave device is stored and displayed on the master device, and master device adds the slave device into a corresponding customized group by selecting a corresponding slave symbol.

7. The electronic device coupling system of claim 5, wherein each electronic device comprises a hot-plug detection port configured to detect an insertion between two electronic devices, when the hot-plug detection port detects the insertion between two electronic devices, the control module of the master device allocates a new sequence number to the slave device, and the slave device stores the new sequence number and connects the new sequence number to local all the information.

8. The electronic device coupling system of claim 5, wherein each electronic device comprises a plurality of bus-bars, each bus-bar has a plurality of types coupling ports, the plurality of bus-bars are arranged on at least three different directions, and each coupling port of any bus-bar in any electronic device is capable of inserting into a corresponding coupling port in another electronic device.

9. The electronic device coupling system of claim 8, wherein the master device is capable of being inserted with a plurality of slave devices in any direction of the at least three different directions, and each inserted slave device is capable of being inserted with a plurality of other slave devices in any direction of the at least three different directions.

10. The electronic device coupling system of claim 8, wherein each bus-bar comprises a hot-plug detection port configured to detect an insertion between two electronic devices, when the hot-plug detection port detects the insertion between two electronic devices, the plurality of types coupling ports of the bus-bar corresponding to the hot-plug detection port are switched on.

11. An electronic device coupling system, the system comprising:
a plurality of electronic devices inserted together, the plurality of electronic devices comprises:
a master device; and
a plurality of slave devices inserted with the master device one by one in at least a chain;
wherein each electronic device has a sequence number according to an insertion sequence, the sequence number is corresponds to all the information of local electronic device, the sequence numbers of the plurality of electronic devices are sorted according to the insertion sequence, the sequence number of the master device is a first number of the sequence; the master device is capable of setting a plurality of customized groups, and each customized group has at least one slave device; and the master device is coupleable to the at least one slave device in any one customized group by the sequence number and all the information corresponding to the sequence number; and
wherein each customized group includes a different slave device assembly, and each customized group has a different group code stored in the master device.

12. The electronic device coupling system of claim 11, wherein the group code of each customized group is displayed on the master device.

13. The electronic device coupling system of claim 12, wherein the master device is coupleable to all the slave devices of any one customized group by selecting a corresponding group code of the customized group.

14. The electronic device coupling system of claim 11, wherein each slave device is capable of selecting other electronic devices to be a local customized group, and the slave device is a new master device of the local customized group.

15. The electronic device coupling system of claim 11, wherein each electronic device comprises a control module, a control bus, and a storage unit, the storage unit stores all the information, and when each slave device is inserted in the at least a chain, the slave device is mapped with the master device through the control bus and all the information.

16. The electronic device coupling system of claim 15, wherein when each slave device is mapped with the master device, a slave symbol corresponding to the mapped slave device is stored and displayed on the master device, and master device adds the slave device into a corresponding customized group by selecting a corresponding slave symbol.

17. The electronic device coupling system of claim 15, wherein each electronic device comprises a hot-plug detection port configured to detect an insertion between two electronic devices, when the hot-plug detection port detects the insertion between two electronic devices, the control module of the master device allocates a new sequence number to the slave device, and the slave device stores the new sequence number and connects the new sequence number to local all the information.

18. The electronic device coupling system of claim 15, wherein each electronic device comprises a plurality of bus-bars, each bus-bar has a plurality of types coupling ports, the plurality of bus-bars are arranged on at least three different directions, and each coupling port of any bus-bar in any electronic device is capable of inserting into a corresponding coupling port in another electronic device.

19. The electronic device coupling system of claim 18, wherein the master device is capable of being inserted with a plurality of slave devices in any direction of the at least three different directions, and each inserted slave device is capable of being inserted with a plurality of other slave devices in any direction of the at least three different directions.

20. The electronic device coupling system of claim 18, wherein each bus-bar comprises a hot-plug detection port configured to detect an insertion between two electronic devices, when the hot-plug detection port detects the insertion between two electronic devices, the plurality of types coupling ports of the bus-bar corresponding to the hot-plug detection port are switched on.

* * * * *